(12) United States Patent
Richards, Jr.

(10) Patent No.: US 8,982,118 B2
(45) Date of Patent: Mar. 17, 2015

(54) STRUCTURE DISCOVERY IN A POINT CLOUD

(75) Inventor: Chester L. Richards, Jr., Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 177 days.

(21) Appl. No.: 13/302,027

(22) Filed: Nov. 22, 2011

(65) Prior Publication Data

US 2013/0127851 A1 May 23, 2013

(51) Int. Cl.
*G06T 17/00* (2006.01)

(52) U.S. Cl.
CPC .............. *G06T 17/00* (2013.01); *G06T 2210/56* (2013.01)
USPC ........................................................ 345/420

(58) Field of Classification Search
CPC ................. G06T 2207/10028; G06T 2210/56; G06T 7/0057; G06T 2219/2016
See application file for complete search history.

(56) References Cited

U.S. PATENT DOCUMENTS

| | | | |
|---|---|---|---|
| 4,982,438 A | 1/1991 | Usami et al. | |
| 6,192,145 B1 | 2/2001 | Anandan et al. | |
| 6,249,600 B1 | 6/2001 | Reed et al. | |
| 6,373,484 B1 | 4/2002 | Orell et al. | |
| 6,420,698 B1 * | 7/2002 | Dimsdale | 250/234 |
| 6,879,946 B2 | 4/2005 | Rong et al. | |
| 7,065,242 B2 | 6/2006 | Petrov et al. | |
| 7,672,484 B2 | 3/2010 | Wiedemann et al. | |
| 7,683,900 B2 * | 3/2010 | Chang et al. | 345/419 |
| 2004/0041805 A1 * | 3/2004 | Hayano et al. | 345/419 |
| 2006/0061566 A1 * | 3/2006 | Verma et al. | 345/419 |
| 2008/0317345 A1 | 12/2008 | Wiedemann et al. | |

OTHER PUBLICATIONS

Dorninger et al. "3D Segmentation of Unstructured Point Clouds for Building Modelling," Sep. 19-21, 2007, International Archives of Photogrammetry, Remote Sensing and Spatial Information Sciences, 36 (3/W49A), Munich, Germany.*
Schwalbe et al. "3D Building Model Generation from Airborne Laser Scanner Data Using 2D GIS Data and Orthogonal Point Cloud Projections," Sep. 12-14, 2005, ISPRS WG III/3, III/4, V/3 Workshop "Laser scanning 2005", Enschede, the Netherlands.*
Zuliani et al. "The MultiRANSAC Algorithm and Its Application to Detect Planar Homographies," IEEE, 2005.*
Schwalbe, "3D Building Model Generation From Airborne Laserscanner Data by Straight Line Detection in Specific Orthogonal Projections," Institute of Photogrammetry and Remote Sensing, 2004, vol. 35, Part B, pp. 249-254.*
Albota et al., "Three-dimensional imaging laser radar with a photon-counting avalanche photodiode array and microchip laser," Vo. 41, No. 36 Applied Optics, Optical Society of America, Dec. 2002.*

* cited by examiner

*Primary Examiner* — Kee M Tung
*Assistant Examiner* — Nicholas R Wilson
(74) *Attorney, Agent, or Firm* — Burns & Levinson LLP; Joseph M. Maraia

(57) ABSTRACT

Described are computer-based methods and apparatuses, including computer program products, for radar data processing. In some examples, the system includes a communication module, a surface discovery module, a linear condensation identification module, and a structure generation module. The communication module is configured to receive 3-dimensional image data from an imaging device. The surface discovery module is configured to rotate the 3-dimensional image data around an axis in 3-dimensional space of the 3-dimensional image data. The linear condensation identification module is configured to identify linear condensations in the rotated 3-dimensional image data. The structure generation module is configured to generate a structure based on the linear condensations and the rotated 3-dimensional image data.

11 Claims, 10 Drawing Sheets

STRUCTURE DISCOVERY IN A POINT CLOUD

BACKGROUND

Construction of a correct wireframe model from a feature point cloud is a challenging issue. Feature point clouds are generally derived from two sensing technologies: (i) three dimensional laser radars (3D Ladar), and (ii) stereo parallax measurements from two, or more, different passive observation cameras (Stereo).

Typically, a 3D Ladar produces dense point clouds. However, because the sensing is usually done from only one position, foreground objects most often completely obscure what is behind them. Since the obscuring foreground objects are in close proximity to the background objects, known wire-frame construction algorithms generally bridge between these objects.

Stereo parallax measurements can be made from multiple camera positions. Thus, in principle, stereo can be less subject to problems with foreground obscurations. However, in practice these obstructions may cause known wire-frame construction algorithms to bridge gaps in the point cloud. Thus, adjacent buildings, separated by a relatively small space, are often treated as a single structure by known wire framing algorithms in stereo.

Thus, a need exists in the art for improved structure discovery in a point cloud.

SUMMARY

One approach is a system that discovers a structure in a point cloud. The system includes a communication module, a surface discovery module, a linear condensation identification module, and a structure generation module. The communication module is configured to receive 3-dimensional image data from an imaging device. The surface discovery module is configured to rotate the 3-dimensional image data around an axis in 3-dimensional space of the 3-dimensional image data. The linear condensation identification module is configured to identify linear condensations in the rotated 3-dimensional image data. The structure generation module is configured to generate a structure based on the linear condensations and the rotated 3-dimensional image data.

Another approach is a method that discovers a structure in a point cloud. The method includes (a) receiving 3-dimensional image data; (b) rotating the 3-dimensional image data around an axis in 3-dimensional space of the 3-dimensional image data; (c) identifying linear condensations in the rotated 3-dimensional image data; and (d) generating a structure based on the linear condensations and the rotated 3-dimensional image data.

Another approach is a computer program product. The computer program product is tangibly embodied in an information carrier. The computer program product includes instructions being operable to cause a data processing apparatus to receive 3-dimensional image data; rotate the 3-dimensional image data around an axis in 3-dimensional space of the 3-dimensional image data; identify linear condensations in the rotated 3-dimensional image data; and generate a structure based on the linear condensations and the rotated 3-dimensional image data.

In other examples, any of the approaches above can include one or more of the following features.

In some examples, the system further includes a structure identification module, a point cloud rotation module, and an image data merge module. The structure identification module is configured to identify common structural elements in one or more surfaces from the 3-dimensional image data. The point cloud rotation module is configured to rotate the one or more surfaces of the 3-dimensional image data based on the identified common structural elements. The image data merge module is configured to merge the one or more surfaces of the 3-dimensional image data to form one or more merged surfaces.

In other examples, the one or more surfaces include a plane, a flat surface, and/or a curved surface.

In some example, the system further includes a parallel line identification module and a structure identification module. The parallel line identification module is configured to identify one or more lines in the linear condensations. The structure identification module is configured to identify common structural elements in one or more surfaces from the 3-dimensional image data based on the one or more lines.

In other examples, the 3-dimensional image data includes a point cloud.

In some examples, parallel planes simultaneously condense into one or more parallel lines during execution of the rotating step (b).

In other examples, orthogonal planes simultaneously project onto orthogonal viewing-planes during execution of the rotating step (b).

In some examples, the rotating step (b) further includes (b-1) projecting isometrically the 3-dimensional image data onto an observation plane.

In other examples, the rotating step (b) further comprises (b-1) selecting the axis based on a plane of interest.

In some examples, the generating step (d) further includes: (d-1) determining a plurality of structural surfaces within the linear condensations; (d-2) generating an image wireframe for each of the plurality of structural surfaces; and (d-3) assembling the plurality of structural surfaces within the image wireframe to form the structure.

The structure discovery techniques described herein can provide one or more of the following advantages. An advantage of the technology is that structures and structural features (e.g., surface planes, cylinders, spheres, compact objects, etc.) are easily distinguished and delineated via the structure discovery techniques described herein, thereby increasing the efficiency of discovering and correctly identifying structures. Another advantage of the technology is that the structure discovery techniques described herein effectively define and compensate for obscurations in the structures, thereby increasing the efficacy of the structure discovery techniques. Another advantage of the technology is that the structure discovery techniques described herein reduce false bridging between structures and other objects, thereby reducing mis-identification of structures and increasing the efficiency of structure discovery by reducing these mis-identifications.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The structure discovery in a point cloud method and apparatus includes technology that, generally, discovers structures and structural features in 3-dimensional image data (e.g., a point cloud, 3-dimensional model, etc.). The technology can be utilized for any type of imaging application (e.g., precision manufacturing, motion picture production, surveillance, sensor fusion, etc.). The technology enables the detection of complex structures (e.g., multi-facade buildings in an urban landscape, multiple ground vehicles in a forest, etc.) and/or the generation of an image wireframe of the imaged landscape. The detected complex structures and/or the image wireframe can be utilized for mapping applications (e.g., 3-dimensional map of a city, directional mapping through a city, etc.) and/or targeting applications (e.g., laser targeting for a particular building, acoustical targeting for a particular window in a building, etc.).

The technology, generally, rotates the 3-dimensional image data around an axis (e.g., x-axis, y-axis, z-axis, or any in between axis) to align points of a structure (e.g., plane, cylinder, sphere, etc.) for extraction of information from the 3-dimensional image data (e.g., linear condensations, structures, etc.). The rotation of the 3-dimensional image data enables projection of the structure onto a coordinate plane to form linear condensations of the structure (e.g., structure becomes a straight line, structure becomes a circle, etc.). The extracted information can be used to identify structures and/or structural features from the point cloud. The structures and/or structural features can include, for example, building facades, domes, ground planes, fences, trees, and/or terrain tangent planes. The technology advantageously enables the extraction of information (e.g., location of a structure, shape of structure, etc.) from a point cloud via rotation and projection techniques as described herein, thereby increasing the efficiency of structure identification from 3-dimensional image data by correctly identifying structures and structural features.

Figure 1:
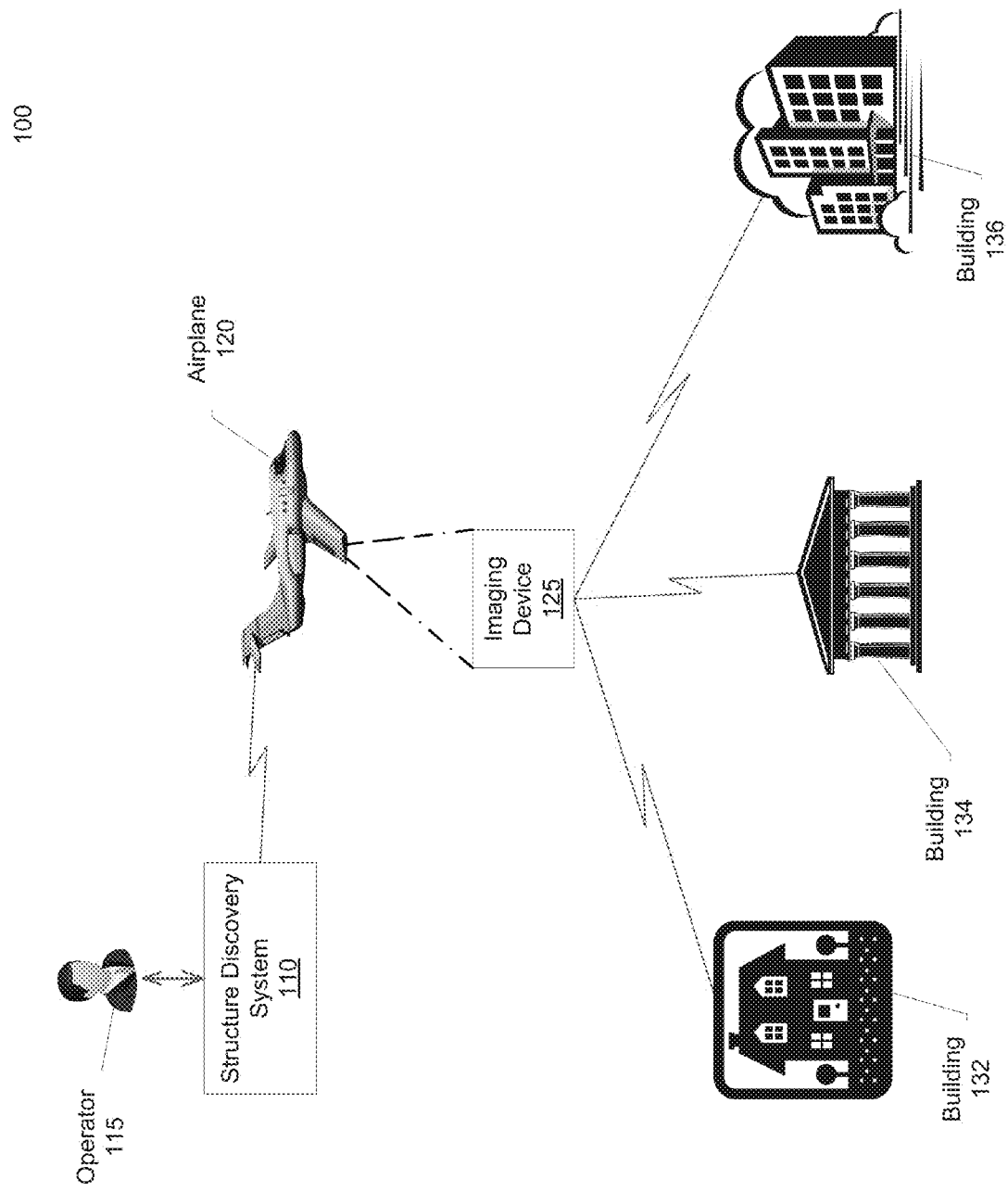
FIG. 1 is a diagram of an exemplary structure discovery environment.

FIG. 1 is a diagram of an exemplary structure discovery environment 100. The structure discovery environment 100 includes a structure discovery system 110, an airplane 120, and a plurality of buildings 132, 134, and 136. The airplane 120 utilizes an imaging device 125 to image the plurality of buildings 132, 134, and 136. The airplane 120 transmits the image data from the imaging device 125 to the structure discovery system 110. The structure discovery system 110 processes the image data to generate one or more structures (e.g., building, tank, wall, etc.). An operator 115 utilizes the structure discovery system 110 to view the one or more structures and/or modify one or more operating parameters (e.g., memory usage, size of structure, etc.) associated with the structure discovery system 110.

Although FIG. 1 illustrates a single imaging device 125, the structure discovery system 110 can utilize image data from a plurality of imaging devices (e.g., two, twenty, thirty, etc.). Although FIG. 1 illustrates the airplane 120 and the image device 125, the technology can utilize any type of image device (e.g., camera, telescope, radar, etc.) and/or image device platform (e.g., car, train, vehicle, truck, helicopter, satellite, etc.). Although FIG. 1 illustrates the plurality of buildings 132, 134, and 136, the structure discovery system 110 can be utilized to discovery any type of structure (e.g., wall, dome, vehicle, etc.).

Figure 2A:
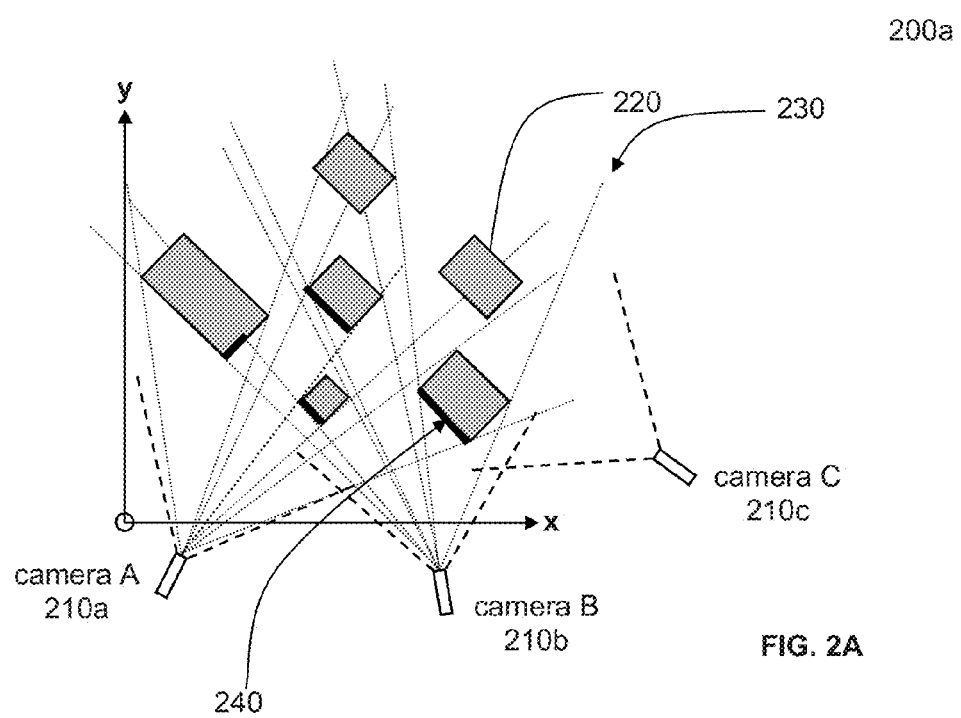
FIGS. 2A-2G are diagrams of exemplary point clouds.

FIG. 2A is a diagram of a point cloud 200a derived from multiple stereo rectified cameras A 210a, B 210b, and C 210c (generally referred to as cameras 210). In FIG. 2A, boxes represent buildings 220. FIG. 2A illustrates a bird's eye view (i.e., vertical towards nadir and the x-y plane) view of an urban scene with several buildings 220 as observed by the cameras 210. The cameras 210 are placed low enough that foreground buildings obstruct background buildings. At least a pair of cameras (e.g., A 210a and B 210b, A 210a and C 210c, etc.), with substantial spacing between them, is utilized for triangulation depth measurements. Tracing rays (e.g., tracing ray 230) from the cameras 210 to the buildings 220 illustrate the views from each camera 210. As illustrated in FIG. 2A, in a dense urban environment, a few facades (e.g., facade 240) are visible to any set of spaced pair of cameras (e.g., camera A 210a and camera B 210b, camera C 210c and camera B 210b, etc.). In some examples, the cameras 210 are separated by a large distance for depth measurement purposes. In other examples, the scene is observed from a plurality of different locations (e.g., single camera at different locations at different times, multiple cameras at different locations, etc.).

Figure 2B:
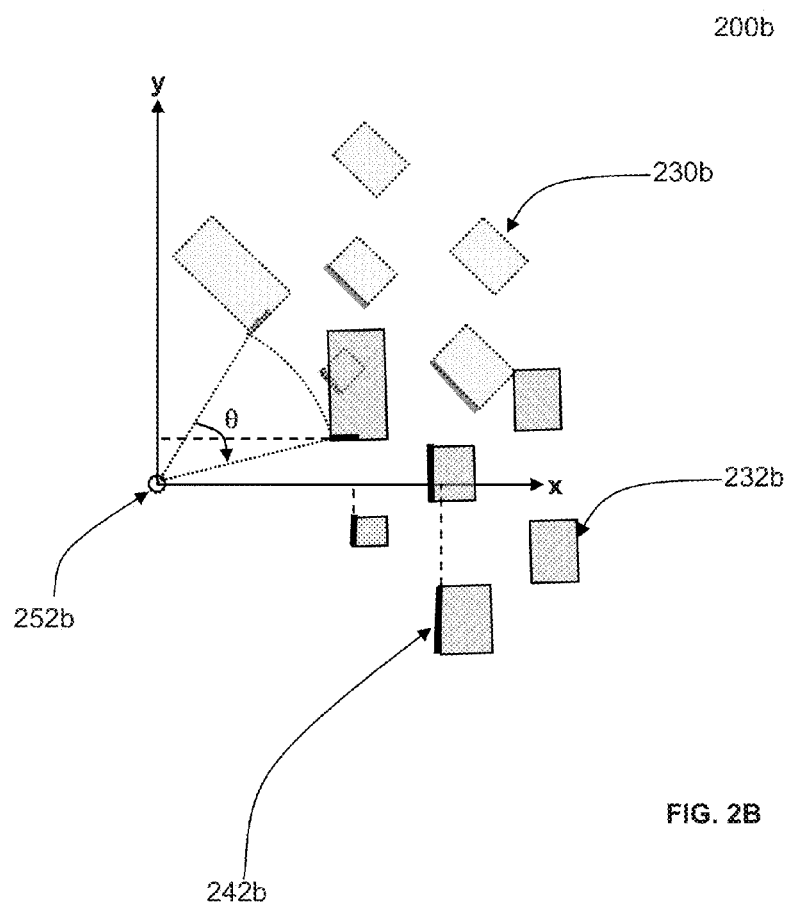

FIG. 2B is a diagram of a rotated point cloud 200b. The structure discovery system 110 rotates the point cloud 200a of FIG. 2A to form the rotated point cloud 200b. The rotated point cloud 200b enables the structure discovery system 110 to extract the facades (e.g., rotated facade 242b) as projected onto the x-axis and the y-axis. As illustrated in FIG. 2B, the radial distance from the origin 252b, of any give part of a structure, remains constant as θ is varied. The individual structures (e.g., structure 232b) traverse circles around the origin 252b, finally coming to rest when the facades are perpendicular to the x and y axis for buildings with right angle facades. In this example, the observed portions of the facades (e.g., 242b) then project either to the x-axis or to the y-axis. In other examples, the structure discovery system 110 rotates an additional 90° in the y-axis projection.

Figure 2C:
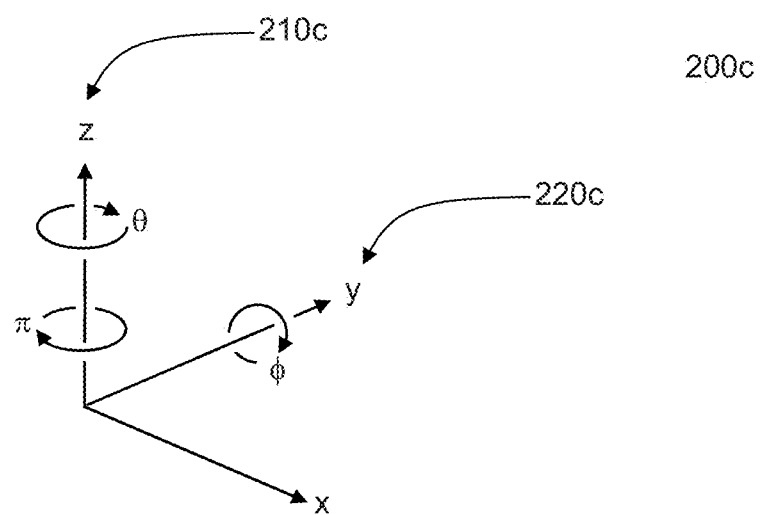

FIG. 2C is a diagram illustrating an exemplary rotation of a point cloud 200c. First, the structure discovery system 110 rotates a point cloud clockwise through angle θ around a vertical z-axis 210c. The first rotation can orient facades of structures into a line projection. Second, the structure discovery system 110 rotates the point cloud clockwise about a y-axis 220c through angle φ. The second rotation can orient the facades of the structures into a vertical projection. Third, as an optional rotation, the structure discovery system 110 rotates the point cloud clockwise around the z-axis 210c through angle π. The third rotation can enable discovery of all of the facades of the structures, the orientation of the facades, and/or the details about the structures. The third rotation can enable separation and identification of foreground obscuring objects.

Although FIG. 2C illustrates the exemplary rotation of the point cloud 200c, the structure discovery system 110 can utilize any number (e.g., four rotations, twenty rotations, etc.) and/or variation of rotations (e.g., clockwise, counter-clockwise, various angles, different angles, etc.) to discovery structures. For example, the structure discovery system 110 can rotate a point cloud counter-clockwise through a different angle around the y-axis 220c and then rotate the point cloud clockwise through another angle around the x-axis 210c to discovery structures within the point cloud.

Figure 2D:
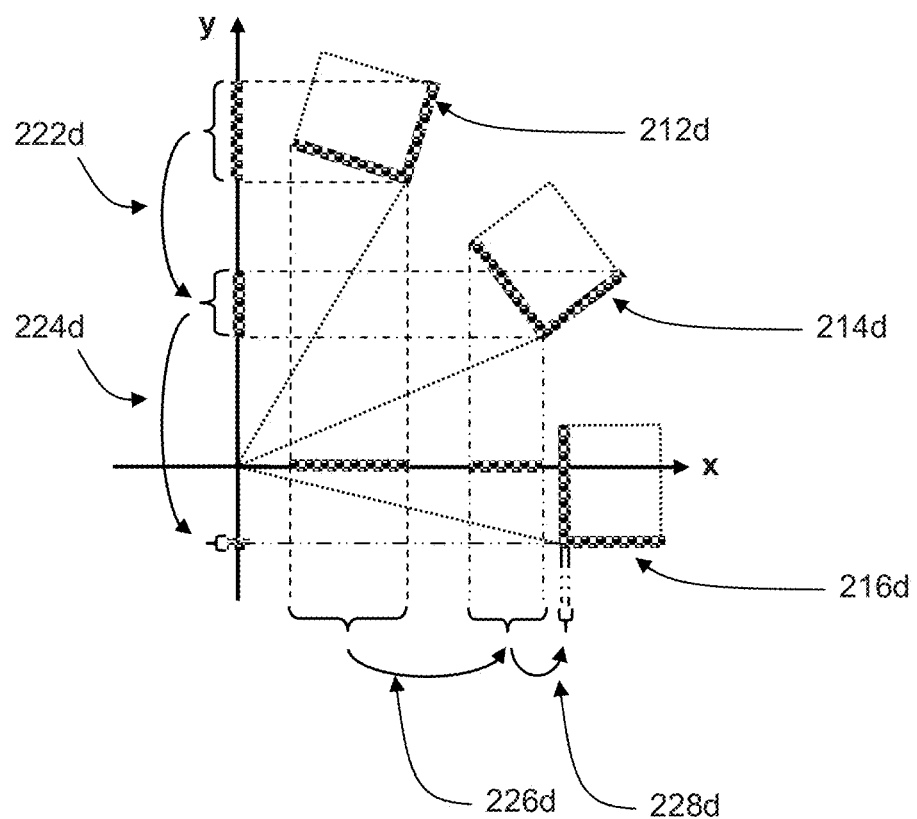

FIG. 2D is a diagram illustrating tracking of facades (e.g., 212d, 214d, and 216d) of a structure in a point cloud 200d. As illustrated in FIG. 2D, the structure discovery system 110 rotates the structures in the point cloud 200d and each of the facades (e.g., 212d, 214d, and 216d) of the structure is rotated (222d to 224d and 226d to 228d).

In some examples, the structure discovery system 110 can identify where each subcloud will project onto the x and y axes as the point cloud 200d is rotated about the origin of the specified Cartesian coordinate system since the structure discovery system 110 has depth measurements of the structures (e.g., input by a user, determined by an image device, etc.) and/or the structure discovery system 110 controls the rotation of the point cloud 200d. The tracking of the facades of the structure advantageously enables the structure discovery system 110 to identify linear condensations in the point cloud (part or all of the 3-dimensional image data), thereby increasing the efficiency of the discovery of structures within the point cloud. The projection of the point cloud onto x and y axes advantageously enables the structures to be fixed in a pixel grid for structure discovery even though the points in the cloud can be anywhere in a continuum (that is, the structures are in the real-world). The structure identification can be, for example, utilized in various applications to identify specific buildings within a city, track changes within a landscape, and/or utilize specific features on a target to track the target within a landscape.

Figure 2E:
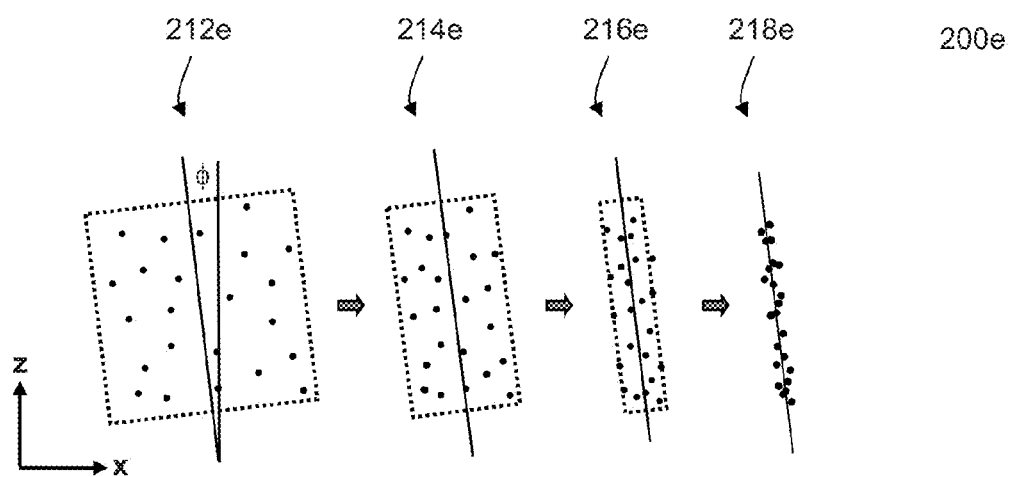

FIG. 2E is a diagram illustrating linear condensation of a subcloud of the point cloud 200e. The structure discovery system 110 rotates the point cloud (212e to 214e to 216e) into a projected line on a coordinate axis to form the linear condensation 218e. The structure discovery system 110 can determine a rotation angle, $\phi$ utilizing the techniques described herein via a regression line fitting through the subcloud. In some examples, the $\phi$ is determined when the variance (or standard deviation) is minimum for the subcloud.

Figure 2F:
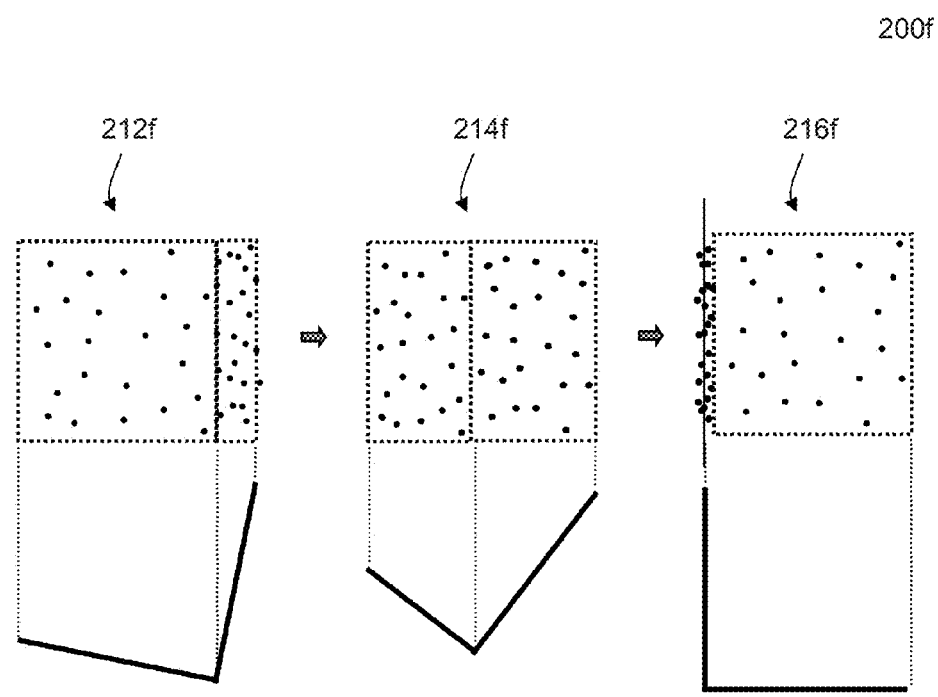

FIG. 2F is a diagram illustrating two facades of a single building in a subcloud 200f. The two facades in FIG. 2F are at right angles to each other. The structure discovery system 110 rotates the point cloud (212f to 214f to 216f) and the points delineating one of the facades condense, upon projection into the x-z or y-z plane, substantially into a line (in some examples, with some scattering). As illustrated in FIG. 2F, the points of the adjacent facade stretch and represent a plane which is parallel to the projection plane. In some examples, the structure discovery system 110 divides the subcloud into adjacent regions and identifies the variation of the variance, or standard deviation, as the full point cloud is rotated. In other examples, the structure discovery system 110 projects the planar condensations, for a given structure, onto the x-z plane and the y-z plane. In this example, the condensations are coherently linked and are predictable because the structure is located on the x and y axis as the point cloud is rotated about the z-axis.

In some examples, the facades are not at right angles to each other. In these examples, the condensation of the facades is not simultaneous and the successive condensation angles, $\theta_A$ and $\theta_B$, provide a physical angle, $\Delta\theta=\theta_A-\theta_B$, between the facades.

Figure 2G:
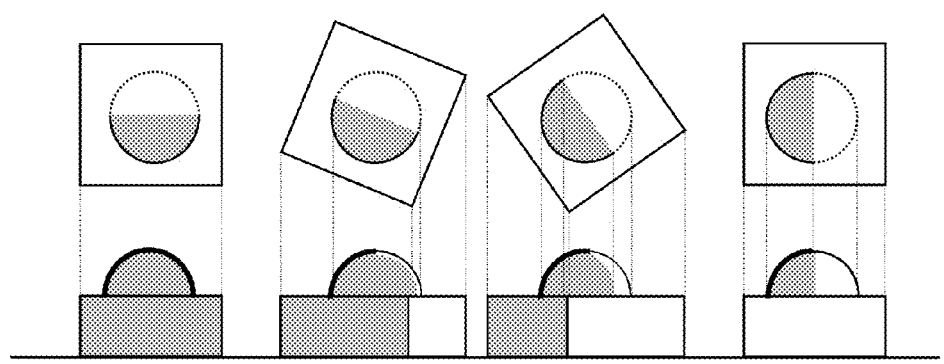

FIG. 2G is a diagram illustrating domes in a subcloud 200g. Domes generally retain a projective shape as the point cloud is rotated—both in $\theta$ and in $\phi$—which is due to the rotational symmetry of the domed structure. Cylinders have a similar property. A dome or cylinder projects an invariance property along an edge (e.g., the edge of the dome remains constant).

In some examples, the structure discovery system 110 rotates the point cloud to discover complex facades via the linear condensations in the rotated point cloud. The complex facades can include, for example, recessed and/or projecting, windows and/or substructures, a porch, and/or a roof building. In other examples, the structure discovery system 110 includes information to delineate selected features (e.g., recessed window, recessed door, etc.) that have dense point clouds. The information to delineate selected features enables the structure discovery system 110 to extend and/or insert the features into the facade.

In some examples, a stereo pair of cameras can generate, through triangulation, an estimate of the distance to a given object. The distance uncertainty can be a function of angular measurement errors coupled with the baseline separation of the cameras. For example, the lines of sight from the cameras to the target can form a 90° angle which can be utilized to minimize the distance uncertainty by using geometric information of the 90° angle.

In other examples, the structure discovery system 110 models individual structures separately after isolating structure subclouds from the general point cloud. The structure discovery system 110 can place the separately constructed structure models in the general landscape model. In some examples, the rotation technique described herein brings all of the partial point clouds to the same scale and orientation. In this example, the structure discovery system 110 can determine the relative positions of the various cameras. In other examples, the structure discovery system 110 performs one or more of the following steps to bring all of the partial point clouds to the same scale and orientation:

1. Orient all of the point clouds so that scene vertical lies along the z-axis of each local coordinate system to put the point clouds in the same frame of reference;

2. In the three camera case (in this example, two partial point clouds) find structural elements (e.g., planes) which are visible in all three cameras (or two different 3D Ladars) to correlate like structural elements together;

3. Rotate the point clouds so that these structural elements are parallel so as to line up the structural elements;

4. Bring the clouds together such that the same plane from the two different partial clouds is merged so as to combine the information from both clouds;

5. Find a second plane, in both partial clouds, which is parallel to the merged plane (e.g., second plane is distant from the first plane, second plane is close to the first plane, etc.) to allow for comparison of the clouds;

6. Expand, or contract, one of the partial point clouds so that the distance between these parallel planes is the same for both point clouds to place the clouds in the same scale and orientation; and 7. Merge the partial point clouds since the partial point clouds are now at the same scale and orientation to form a merged point cloud.

In some examples, the structure discovery system 110 chains triplets of cameras together to chain partial point clouds together to form a comprehensive view of the scene. In this example, each triplet produces two partial point clouds that are used to provide a comprehensive view of the scene. For example, a first link in a typical chain includes camera one paired with camera two, then camera two with camera three, and the second link is camera two pair with camera three, then camera three with camera four, and etc.

In other examples, the structure discovery system 110 is utilized to form a single point cloud from aerial photography images. In this example, substantial portions of a scene (e.g., 80%, 90%, etc.) are visible to all the camera positions. The substantial portions of the scene can be utilized to provide additional views of the structures and increase the efficiency of the technology by increasing the rate of structure discovery. In this example, the structure discovery system 110 can delineate all the structures, and all sides of the structures, while maintaining a common frame of reference for merging all the partial point clouds.

Figure 3:
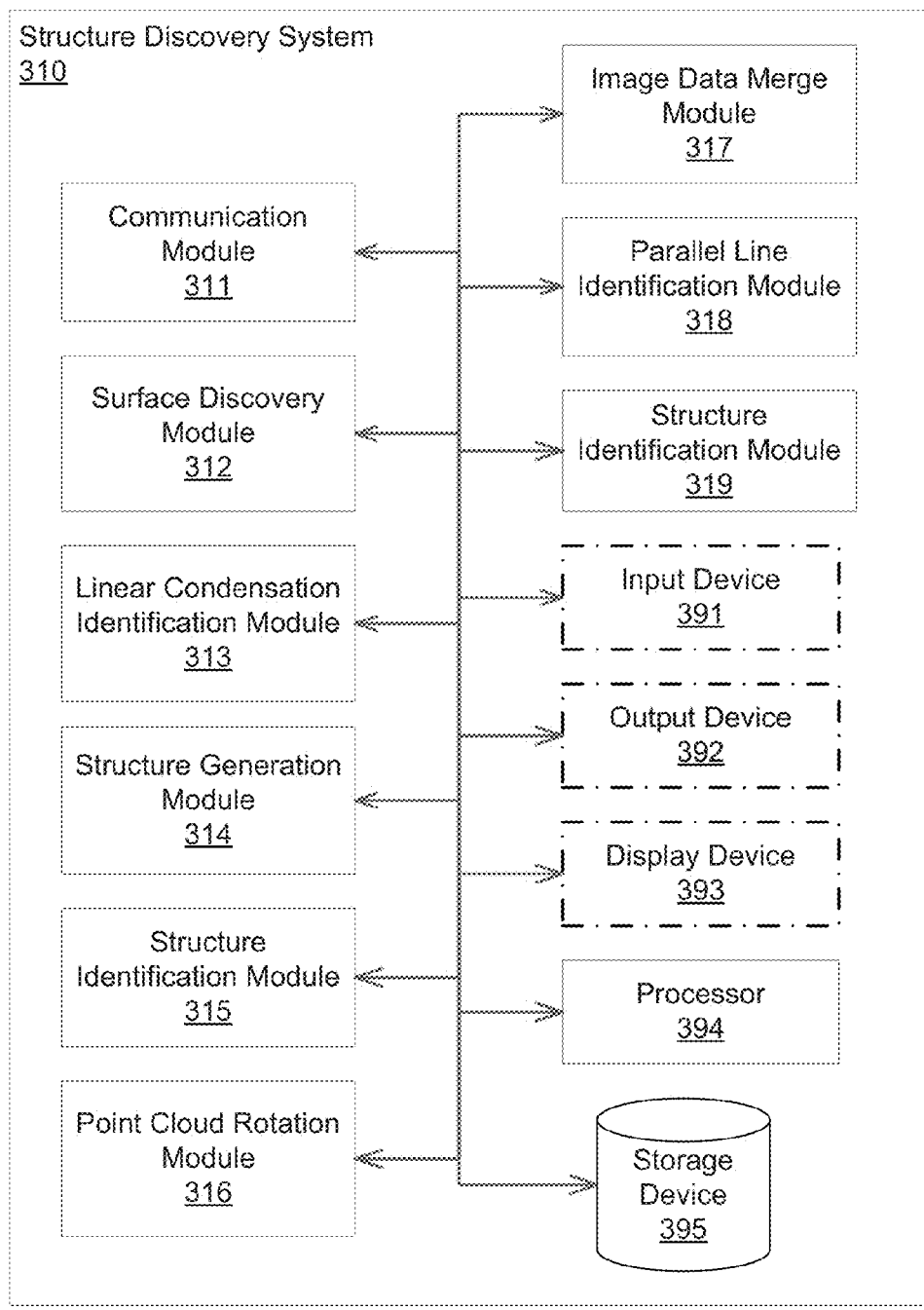
FIG. 3 is a diagram of an exemplary structure discovery system.

FIG. 3 is a diagram of a structure discovery system 310. The structure discovery system 310 includes a communication module 311, a surface discovery module 312, a linear condensation identification module 313, a structure generation module 314, a structure identification module 315, a point cloud rotation module 316, an image data merge module 317, a parallel line identification module 318, a structure identification module 319, an input device 391, an output device 392, a display device 393, a processor 394, and a storage device 395. The input device 391, the output device 392, and the display device 393 are optional components of the structure discovery system 310. The modules and devices described herein can, for example, utilize the processor 394 to execute computer executable instructions and/or the modules and devices described herein can, for example, include their own processor to execute computer executable instructions (e.g., an encryption processing unit, a field programmable gate array processing unit, etc.). It should be understood that the structure discovery system 310 can include, for example, other modules, devices, and/or processors known in the art and/or varieties of the illustrated modules, devices, and/or processors.

The communication module 311 communicates information to/from the structure discovery system 310. The communication module 311 receives 3-dimensional image data from an imaging device (e.g., the imaging device 125 of FIG. 1, a camera, a radar, etc.). The communication module 311 can communicate the received 3-dimensional image data to the surface discovery module 312 and/or store the received 3-dimensional image data via the storage device 395.

The surface discovery module 312 rotates (e.g., 90° counter-clockwise, 45° clockwise, etc.) the 3-dimensional image data around an axis (e.g., z-axis, y-axis, etc.) in 3-dimensional space of the 3-dimensional image data. The rotation of the 3-dimensional image data can enable points within the 3-dimensional image data to linearly condense. The linear condensation identification module 313 identifies linear condensations (e.g., straight line, circular line, etc.) in the rotated 3-dimensional image data. The identification of the linear condensations can identify the edges of the structures within the 3-dimensional image data. The structure generation module 314 generates a structure (e.g., a building in a wireframe, a tank in a wireframe, etc.) based on the linear condensations and the rotated 3-dimensional image data. The generated structure can be utilized to identify structural elements within a scene associated with the 3-dimensional image data (e.g., streets and buildings within a city, doorways on a building, etc.).

The structure identification module 315 identifies common structural elements (e.g., window in a wall of a building, a door in a wall of a building, etc.) in one or more surfaces (e.g., wall, side, etc.) from the 3-dimensional image data. The common structural elements can be utilized to identify a building and/or track a structure. The point cloud rotation module 316 rotates the one or more surfaces of the 3-dimensional image data based on the identified common structural elements (e.g., rotates the point cloud to identify a door, rotates the point cloud to form a linear condensation of a garage door, etc.). The rotations of the one or more surfaces can increase the rate of correct identification of structures within the 3-dimensional image data.

The image data merge module 317 merges the one or more surfaces (e.g., parallel walls, line structure, etc.) of the 3-dimensional image data to form one or more merged surfaces. The merging of the one or more surfaces can enable point clouds generated from multiple point clouds to be merged together to increase the rate of correct identification of structures within the 3-dimensional image data. The parallel line identification module 318 identifies one or more lines in the linear condensations. The identification of the one or more lines can enable the detection of sides of structures within the 3-dimensional image data. The structure identification module 319 identifies common structural elements (e.g., window, door, etc.) in one or more surfaces from the 3-dimensional image data based on the one or more lines.

In some examples, the one or more surfaces include a plane, a flat surface, a curved surface, and/or any other type of surface (e.g., textured surface, spherical surface, etc.). In other examples, the 3-dimensional image data includes a point cloud and/or any other type of 3-dimensional image data.

The input device 391 receives information associated with the structure discovery system 310 from a user (not shown) and/or another computing system (not shown). The input device 391 can include, for example, a keyboard, a scanner, etc. The output device 392 outputs information associated with the structure discovery system 310 (e.g., information to a printer (not shown), information to a speaker, etc.).

The display device 393 displays information associated with the structure discovery system 310 (e.g., status information, configuration information, structure detection, etc.). The processor 394 executes the operating system and/or any other computer executable instructions for the structure discovery system 310 (e.g., executes applications, etc.).

The storage device 395 stores image data and/or structure information. The storage device 395 can include a plurality of storage devices and/or the structure discovery system 310 can include a plurality of storage devices (e.g., an image data storage device, a processed image data storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
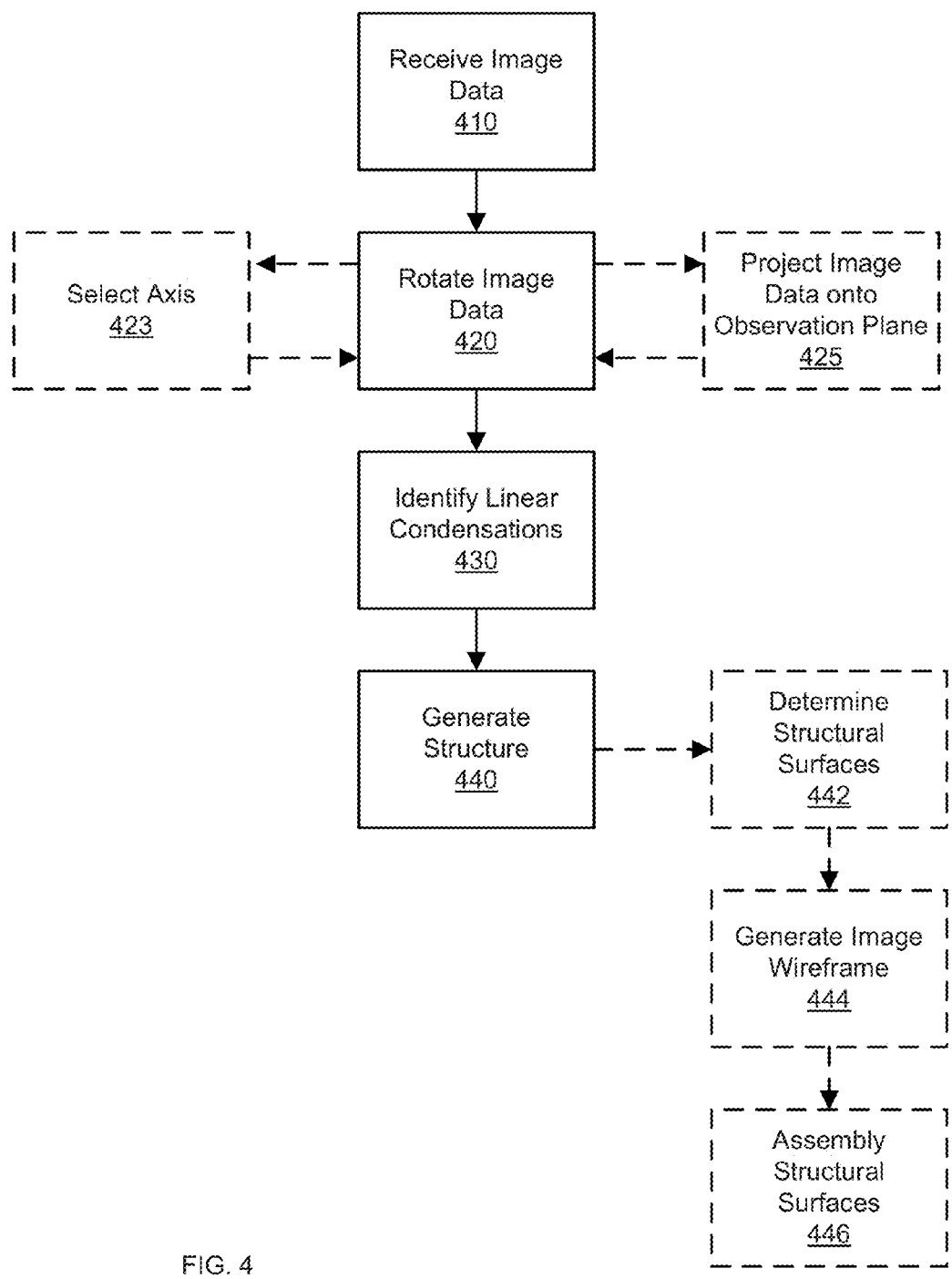
FIG. 4 is a flowchart of an exemplary structure discovery method.

FIG. 4 is a flowchart of another exemplary structure discovery in a point cloud method utilizing, for example, the structure discovery system 310 of FIG. 3. The communication module 311 receives (410) 3-dimensional image data (e.g., directly from an imaging device, from a storage device, etc.). The surface discovery module 312 rotates (420) the 3-dimensional image data around an axis in 3-dimensional space of the 3-dimensional image data (e.g., rotates the 3-dimensional image data 90° clockwise around the x-axis, rotates the 3-dimensional image data 40° counter-clockwise around the z-axis, etc.). The linear condensation identification module 313 identifies (430) linear condensations (e.g., lines, circles, etc.) in the rotated 3-dimensional image data. The structure generation module 314 generates (440) a structure (e.g., building, car, etc.) based on the linear condensations and the rotated 3-dimensional image data.

In some examples, the surface discovery module 312 projects (425) isometrically the 3-dimensional image data onto an observation plane (e.g., viewing plane from image acquisition system, viewing plane from camera, etc.). In other examples, the surface discovery module 312 selects (423) the axis based on a plane of interest. For example, the surface discovery module 312 selects the z-axis based on the plane of interest being the vertical surface of buildings. As another example, the surface discovery module 312 selects the x-axis based on the plane of interest being a horizontal roadway.

In some examples, the structure generation module 314 determines (442) a plurality of structural surfaces within the linear condensations. The structure generation module 314 generates (444) an image wireframe for each of the plurality of structural surfaces. The structure generation module 314 assembles (446) the plurality of structural surfaces within the image wireframe to form the structure.

In some examples, parallel planes simultaneously condense into one or more parallel lines during execution of the rotating step (420). In other examples, orthogonal planes simultaneously project onto orthogonal viewing-planes during execution of the rotating step (420).

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A structure discovery system, the system comprising:
    a communication processor configured to receive 3-dimensional image data from an imaging device;
    a surface discovery processor configured to rotate the 3-dimensional image data around axes in 3-dimensional space of the 3-dimensional image data to align points of at least one structure in the 3-dimensional image data and project the at least one structure onto a coordinate plane, wherein rotation of the 3-dimensional image data includes: i) rotating the 3-dimensional data through a first angle around a z axis, wherein rotation of the 3-dimensional data through a first angle orients facades of structures into a line projection, ii) rotating the 3-dimensional data through a second angle around a y-axis, wherein rotation of the 3-dimensional data around the second angle orients the facades of the structures into a vertical projection and iii) rotating the 3-dimensional data through a third angle around the z-axis, wherein rotation of the 3-dimensional data through the third angle a) enables discovery of all facades of the structures, orientation of the facades, and b) enables separation and identification of foreground obscuring objects;
    a linear condensation identification processor configured to identify linear condensations in the rotated 3-dimensional image data; and
    a structure generation processor configured to generate the at least one structure based on the linear condensations and the rotated 3-dimensional image data.

2. The system of claim 1, further comprising:
    a structure identification processor configured to identify common structural elements in one or more surfaces from the 3-dimensional image data;
    a point cloud rotation processor configured to rotate the one or more surfaces of the 3-dimensional image data based on the identified common structural elements; and
    an image data merge processor configured to merge the one or more surfaces of the 3-dimensional image data to form one or more merged surfaces.

3. The system of claim 2, wherein the one or more surfaces comprises a plane, a flat surface, a curved surface, or any combination thereof.

4. The system of claim 1, further comprising:
    a parallel line identification processor configured to identify one or more lines in the linear condensations; and
    a structure identification processor configured to identify common structural elements in one or more surfaces from the 3-dimensional image data based on the one or more lines.

5. The system of claim 1, wherein the 3-dimensional image data comprises a point cloud.

6. A method for structure discovery in a point cloud, the method comprising:
    (a) receiving 3-dimensional image data;
    (b) rotating the 3-dimensional image data around axes in 3-dimensional space of the 3-dimensional image data to align points of at least one structure in the 3-dimensional image data and project the at least one structure onto a coordinate plane, wherein rotating the 3-dimensional image data includes: i) rotating the 3-dimensional data through a first angle around a z-axis, wherein rotation of the 3-dimensional data through a first angle orients facades of structures into a line projection, ii) rotating the 3-dimensional data through a second angle around a y-axis, wherein rotation of the 3-dimensional data around the second angle orients the facades of the structures into a vertical projections and iii) rotating the 3-dimensional data through a third angle around the z-axis, wherein rotation of the 3-dimensional data through the third angle a) enables discovery of all facades of the structures, orientation of the facades, and b) enables separation and identification of foreground obscuring objects;
    (c) identifying linear condensations in the rotated 3-dimensional image data; and
    (d) generating the at least one structure based on the linear condensations and the rotated 3-dimensional image data.

7. The method of claim 6, wherein orthogonal planes simultaneously project onto orthogonal viewing-planes during execution of step (b).

8. The method of claim 6, wherein step (b) further comprises (b-1) projecting isometrically the 3-dimensional image data onto an observation plane.

9. The method of claim 6, wherein step (b) further comprises (b-1) selecting the axis based on a plane of interest.

10. The method of claim 6, wherein step (d) further comprises:
    (d-1) determining a plurality of structural surfaces within the linear condensations;
    (d-2) generating an image wireframe for each of the plurality of structural surfaces; and
    (d-3) assembling the plurality of structural surfaces within the image wireframe to form the structure.

11. A non-transitory computer program product, tangibly embodied in a non-transitory information carrier, the non-transitory computer program product including instructions being operable to cause a data processing apparatus to:
    receive 3-dimensional image data;
    rotate the 3-dimensional image data around axes in 3-dimensional space of the 3-dimensional image data to align points of at least one structure in the 3-dimensional image data and project the at least one structure onto a coordinate plane, wherein rotation of the 3-dimensional image data includes: i) rotating the 3-dimensional data through a first angle around a z-axis, wherein rotation of the 3-dimensional data through a first angle orients facades of structures into a line projection, ii) rotating the 3-dimensional data through a second angle around a y-axis, wherein rotation of the 3-dimensinoal data around the second angle orients the facades of the structures into a vertical projections and iii) rotating the 3-dimensional data through a third angle around the z-axis, wherein rotation of the 3-dimensinoal data through the third angle a) enables discovery of all facades of the structures, orientation of the facades, and b) enables separation and identification of foreground obscuring objects;
    identify linear condensations in the rotated 3-dimensional image data; and
    generate the at least one structure based on the linear condensations and the rotated 3-dimensional image data.

* * * * *